United States Patent [19]

Luciani et al.

[11] Patent Number: 4,997,138

[45] Date of Patent: Mar. 5, 1991

[54] METHODS AND APPARATUS FOR PRODUCING STATORS WITH COIL TERMINATIONS AT BOTH ENDS

[75] Inventors: Sabatino Luciani; Antonio Lumini, both of Florence, Italy

[73] Assignee: Axis USA, Inc., Marlborough, Mass.

[21] Appl. No.: 565,173

[22] Filed: Aug. 9, 1990

Related U.S. Application Data

[63] Continuation of Ser. No. 321,919, Mar. 13, 1989, abandoned.

[51] Int. Cl.$^5$ .................. B65H 81/06; H01F 5/04
[52] U.S. Cl. ........................ 242/7.03; 29/605; 242/1.1 A
[58] Field of Search .................. 242/1.1 E, 7.03, 7.11, 242/1.1 R, 1.1 A, 7.14, 7.17; 29/605, 596; 310/71

[56] References Cited

U.S. PATENT DOCUMENTS

| | | | |
|---|---|---|---|
| 3,383,058 | 5/1968 | Slayton | 242/1.1 R |
| 4,000,764 | 1/1977 | Reiger | 140/113 |
| 4,074,418 | 2/1978 | Pearsall | 29/596 |
| 4,428,113 | 1/1984 | Fischer et al. | 29/736 |

FOREIGN PATENT DOCUMENTS

| | | |
|---|---|---|
| 0040115 | 11/1981 | France . |
| 59-113763 | 6/1984 | Japan . |
| 0927956 | 6/1963 | United Kingdom .................. 310/71 |

*Primary Examiner*—Daniel P. Stodola
*Assistant Examiner*—William G. Battista, Jr.
*Attorney, Agent, or Firm*—Eric C. Woglom; Robert R. Jackson

[57] ABSTRACT

Methods and apparatus for winding stators (e.g., electric motor stators) so that the ends of each coil can be terminated at respective opposite ends of the stator. The coil wire is anchored adjacent a first end of the stator. Then the coil supply means is alternately reciprocated longitudinally along and rotationally about the longitudinal axis of the stator to wind the wire on the stator. When the desired number of windings has been applied, the wire supply means is stopped adjacent the second end of the stator and the wire is anchored adjacent that end of the stator. The wire is then cut between the second anchoring point and the wire supply means, and the wire supply means is returned to the starting position to prepare for winding the next stator.

4 Claims, 6 Drawing Sheets

METHODS AND APPARATUS FOR PRODUCING STATORS WITH COIL TERMINATIONS AT BOTH ENDS

This is a continuation of application Ser. No. 321,919, filed Nov. 13, 1989 now abandoned.

BACKGROUND OF THE INVENTION

This invention relates to methods and apparatus for producing stators (e.g., electric motor stators), and more particularly to methods and apparatus for producing stators having coil terminations at both ends of the stator.

Most stators are made with the start and finish leads of the stator coils terminated on terminals located at only one axial end of the stator. Recently, however, electric motor manufacturers have become interested in producing stators with some coil leads terminated at one end of the stator and other coil leads terminated at the other end of the stator. For example, motors are being designed with two coils on each stator pole, the second coil being used as a brake coil for the motor. The leads of the second coil could be terminated at the same end as the first coil, and this would not affect the known stator winding methods and apparatus. However, some of these stator designs call for terminating some of the leads at the other end of the stator, which requires new stator winding methods and apparatus.

In view of the foregoing, it is an object of this invention to provide improved stator manufactoring methods and apparatus.

It is another object of this invention to provide methods and apparatus for producing stators having coil leads terminated at both ends of the stator.

SUMMARY OF THE INVENTION

These and other objects of the invention are accomplished in accordance with the principles of the invention by providing methods and apparatus for winding stators so that the ends of any coil can be terminated at respective opposite ends of the stator if desired. The wire for such a coil is anchored adjacent a first end of the stator. Then the coil supply means is alternately reciprocated longitudinally along and rotationally about the longitudinal axis of the stator to wind the wire on the stator. When the desired number of windings has been applied to the stator, the wire supply means is stopped adjacent the second end of the stator and the wire is anchored adjacent that end of the stator. The wire is then cut between the second anchoring point and the wire supply means, and the wire supply means is returned to the starting position to prepare for winding the next stator.

Further features of the invention, its nature and various advantage will be more apparent from the accompanying drawings and the following detailed description of the preferred embodiments.

DETAILED DESCRIPTION OF THE PREFERRED EMBODIMENTS

Figure 1:
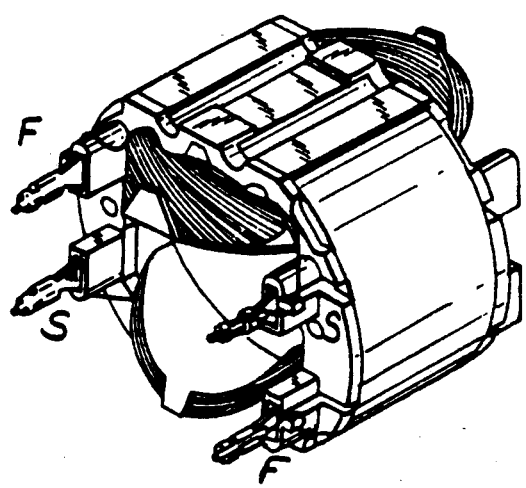
FIG. 1 is a perspective view of a prior art two-pole stator having all coil leads terminated at one end of the stator.

As has been mentioned, FIG. 1 shows a prior art two-pole stator having one coil wound on each pole. Both the start end S and the finish end F of each coil are terminated on the front end of the stator as viewed in FIG. 1. There are no coil terminations on the opposite rear end (largely hidden in FIG. 1) of the stator.

Figure 4:
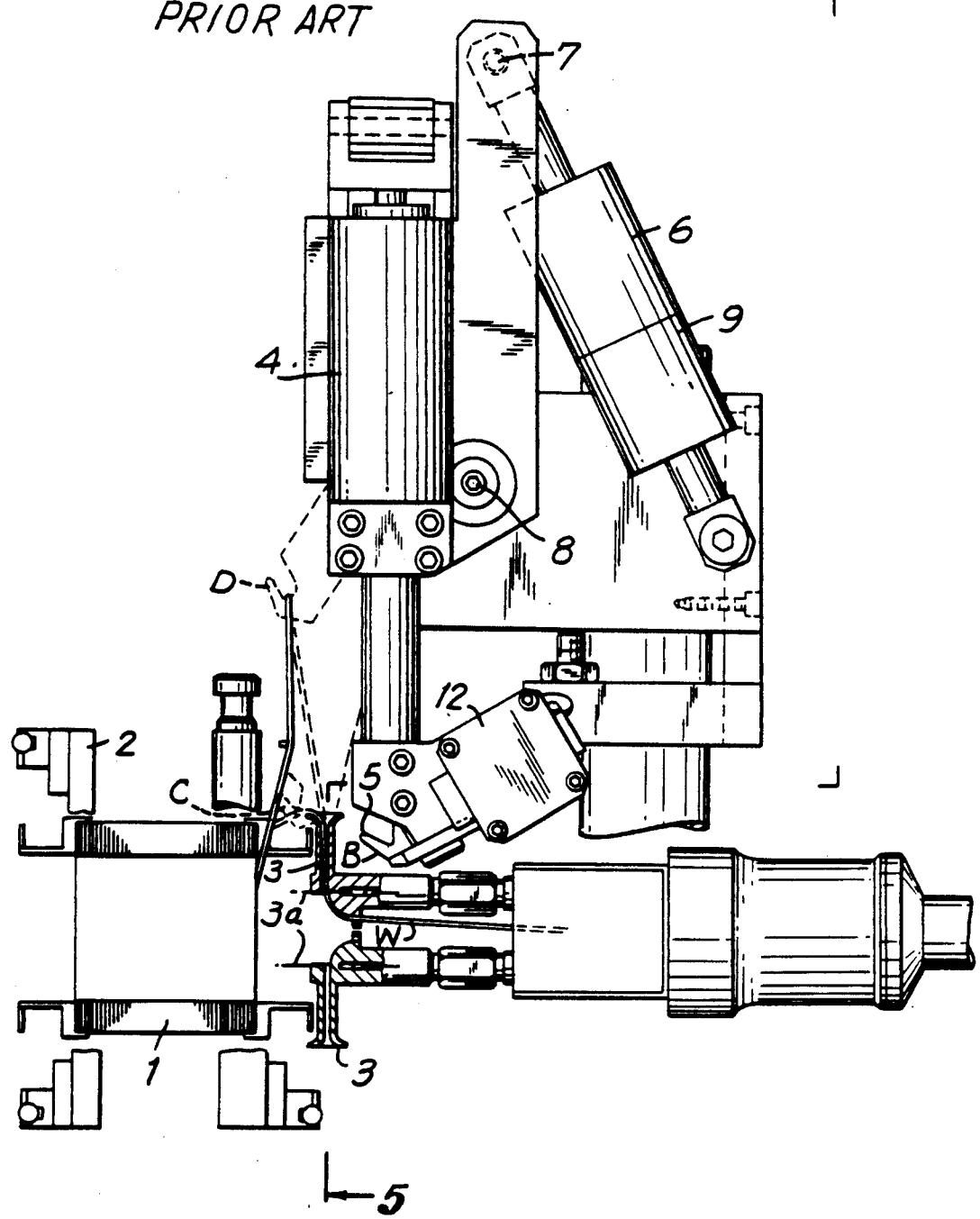
FIG. 4 is a partial elevational view, partly in section, of prior art apparatus for winding stators of the type shown in FIG. 1.
Figure 5:
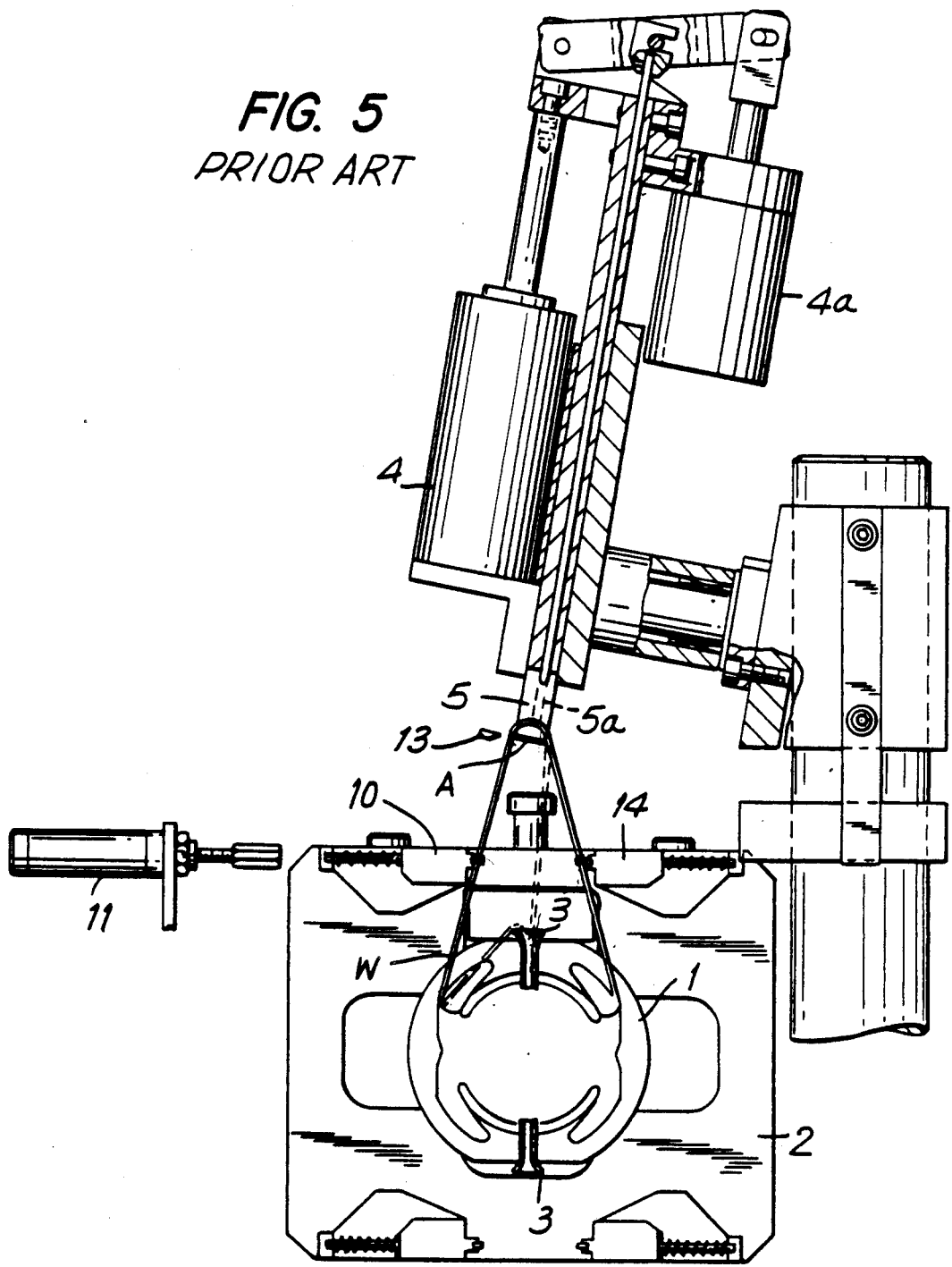
FIG. 5 is a partial elevational view, partly in section, taken generally along the line 5—5 in FIG. 14, but showing the apparatus at another point in its operating cycle.
Figure 6:
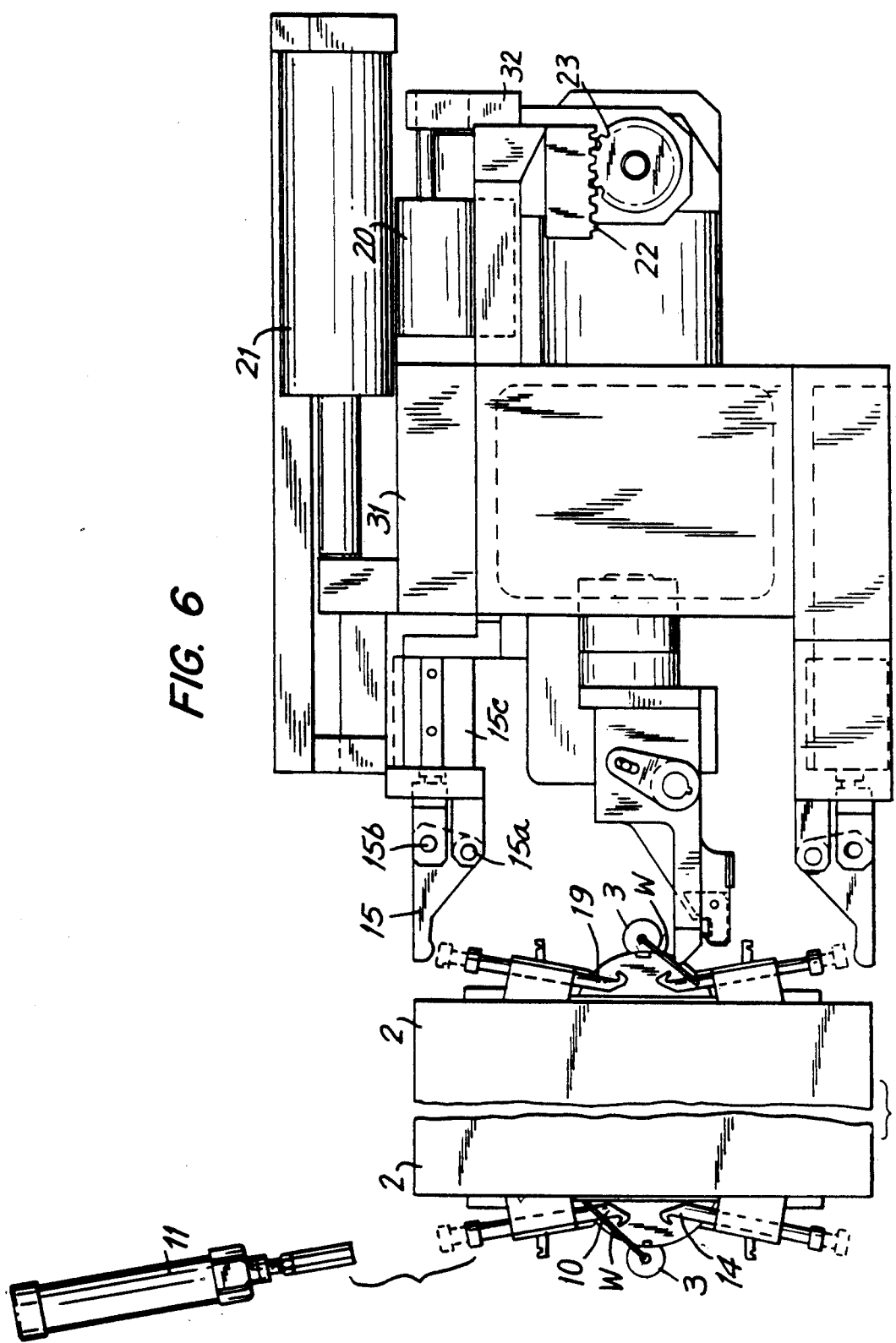
FIG. 6 is a plan view of a portion of the prior art apparatus of FIGS. 4 and 5 (on the left), together with the additional apparatus of this invention (on the right).

Prior art apparatus for producing stators of the type shown in FIG. 1 is shown in part in FIGS. 4 and 5, and in the left-hand portion of FIG. 6. Stator 1 is removably mounted in stator housing 2. The wire W for the upper and lower coils is supplied by upper and lower needles 3, respectively, which are made to alternately reciprocate longitudinally and angularly relative to stator 1 in order to wind the coils around the stator poles. In other words, needles 3 are first rotated to one side of the associated pole, then driven longitudinally through the stator, rotated back to the other side of the associated pole, pulled longitudinally back through the stator, and so on until the required number of windings has been placed on each pole. Note that in this particular embodiment each needle rotates about its own longitudinal axis 3a, so that when both needles are thus fully rotated to one side or the other, the needles can pass axially through stator 1 without interference.

When the coils have been wound, needles 3 are retracted and stopped in the position shown in FIGS. 4 and 5, and on the left in FIG. 6. Only the apparatus for ending the upper coil is shown and will now be described, it being understood that the lower coil ending apparatus is similar and operates at the same time. As shown in chain-dotted lines in FIGS. 4 and 5, the wire extends from upper needle 3 to the left-hand side of the upper coil as viewed in FIG. 5. Cylinder 4 retracts in order to lower hook 5 from the position A shown in FIG. 5 to the position B shown in solid lines in FIG. 4. Cylinder 6 then retracts in order to rotate elements 4, 5, etc., about pivotal mounting 8 via pivotal connection 7. This causes hook 5 to move from position B to position C in FIG. 4, thereby engaging the wire extending from the upper stator pole.

Cylinder 4 is now extended and cylinder 9 is retracted to cause hook 5 to move from position C to position D in FIG. 4. Cylinder 9 acts along the same axis as cylinder 6 so that retraction of cylinder 9 causes additional rotation of hook 5 as it travels from position C to position D. These motions of hook 5 pull a loop of additional wire from needle 3 and cause the left-hand leg of that loop as viewed in FIG. 5 to enter claw 10 which is mounted on stator housing 2. Cylinder 11 is extended at the appropriate time to open claw 10 and allow it to receive the wire. Thereafter, cylinder 11 is retracted to allow the depicted spring to close claw 10 on the wire. Cylinder 4a is now retracted to cause clamp 5a to clamp the wire loop in hook 5. Cylinder 12, which is mounted on hook 5, is then operated to cause knife 13 to cut through the left-hand leg of the wire loop. Stator 1 is now free on any connection to the wire emanating from needle 3. Stator housing 2 (with wound stator 1 still inside) can now be moved away from the winding station by other parts of the apparatus (not shown) in order to convey the stator to a terminating station (also not shown) where the coil ends are permanently mounted on the end of the stator shown in FIG. 1.

As the wound stator is thus being conveyed away, a new unwound stator is brought into position adjacent needles 3 in another stator housing 2. When the new stator and stator housing are in position, needles 3 are rotated (clockwise as viewed in FIG. 5) so that the end of the upper needle is adjacent the right-hand side of the upper pole. This causes the wire extending from the end of needle 3 to hook 5 to enter claw 14 on stator housing 2. A cylinder (not shown, but similar to cylinder 11) is extended at the appropriate time to open clamp 14 to allow it to receive the wire extending from the end of needle 3. Thereafter, that cylinder is retracted to allow the depicted spring to close claw 14 on the wire. Winding of the new stator can now begin, and all of the elements associated with hook 5 are returned to their initial positions to prepare them for use as described above at the end of the stator winding cycle.

From the foregoing it will be apparent that by itself the apparatus of FIGS. 4 and 5 is only suitable for use in winding stators having all coil ends terminated on the end of the stator which is visible in FIG. 5.

Figure 7:
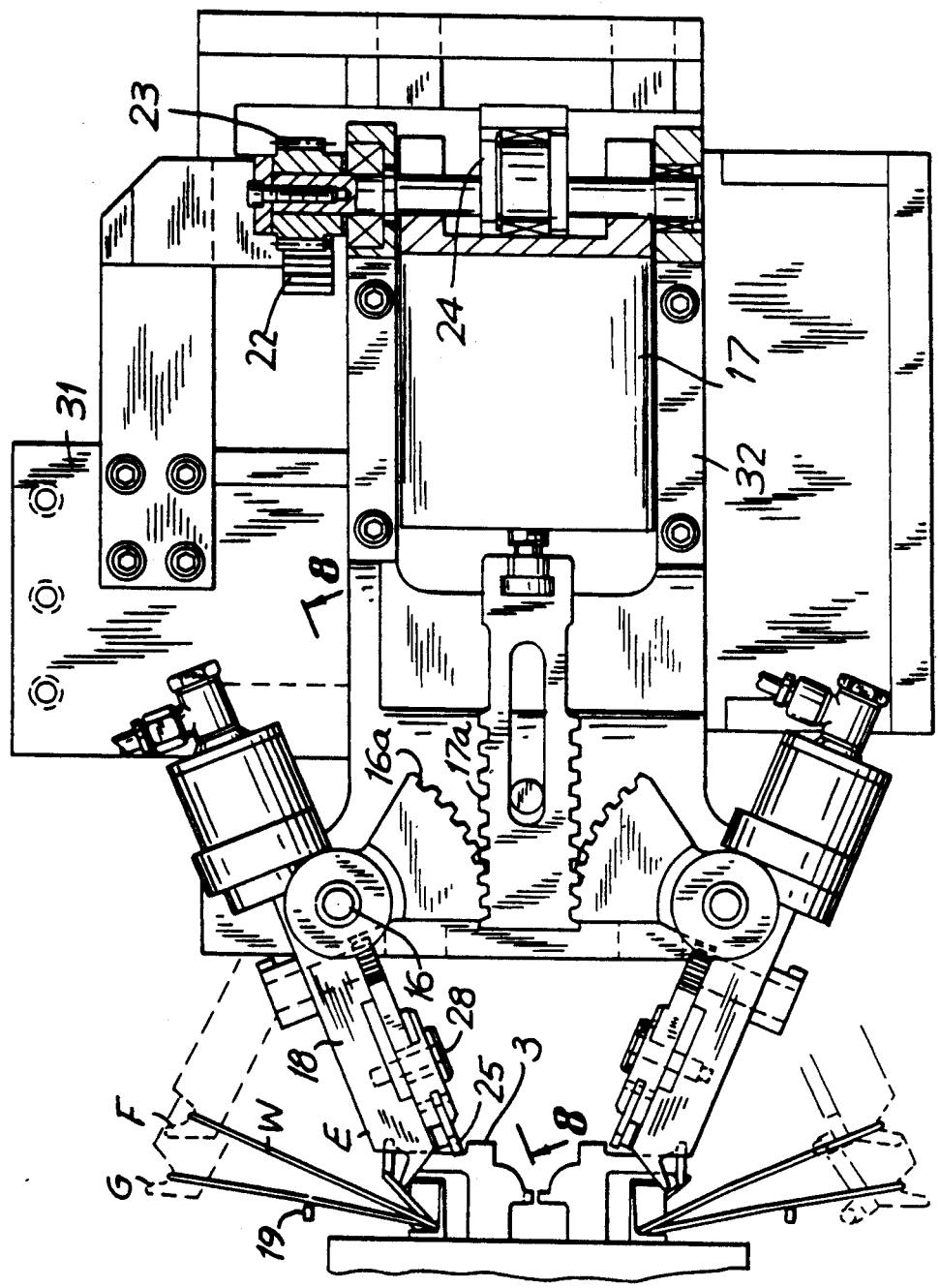
FIG. 7 is a partial elevational view, partly in section, of the right-hand portion of the apparatus shown in FIG. 6.

FIGS. 6 and 7 show an illustrative embodiment of apparatus constructed in accordance with this invention which can be added to the apparatus of FIGS. 4 and 5 to allow some coil ends to be terminated on one end of the stator, while other coil ends are terminated on the other end of the stator.

The right-hand portion of FIG. 6 shows the condition of the apparatus after the stator has been fully wound. Needles 3 extend through the stator (from the left) and have been rotated so that their ends are vertical (see also FIG. 7). Accordingly, wire extends from upper needle 3 to the lower side (as viewed in FIG. 6) of the upper coil. (Again, only termination of the upper coil will be described in detail, it being understood that the lower coil is terminated similarly at the same time.) Cylinder 21 then moves the "inner lead-pull mechanism" (i.e., the apparatus shown on the right in FIG. 6 and in FIG. 7) to the left toward the stator and therefore into the position shown in FIGS. 6 and 7. (Cylinder 21 is mounted on the machine framework and moves slide 31 (on which elements 15, 20, and 22 are mounted) and slide 32. Slide 32 is movable on appropriate guides with respect to slide 31 by operation of cylinder 20. Elements 16 are mounted on slide 32, and cylinder 17 is movably mounted on slide 32 on guides which allow that cylinder to move in response to rotation of pinion 23. This structure will become clearer as the description of its operation proceeds.)

Figure 8:
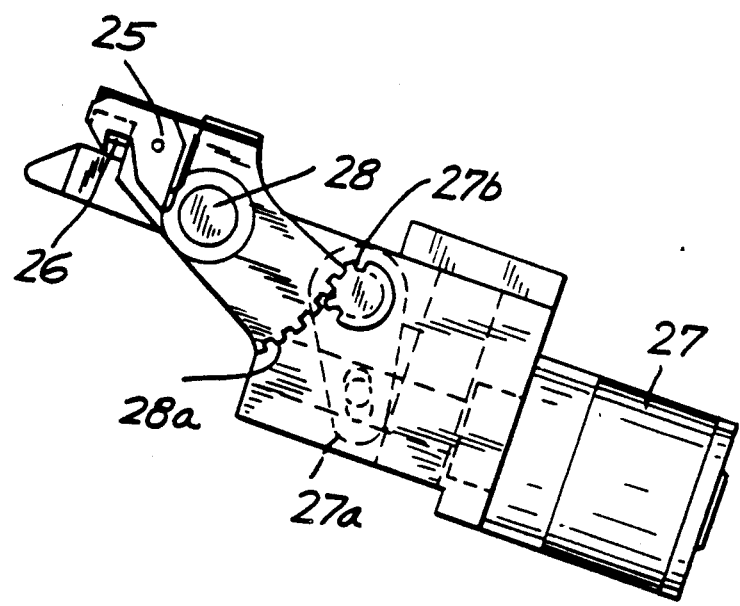
FIG. 8 is a partial elevational view taken along the line 8—8 in FIG. 7.

Claw 19 is opened by pivoting lever 15 counterclockwise about pivot 15a. Lever 15 is pivoted in this manner by extension of cylinder 15c which acts on the lever through connection 15b. Cylinder 17 then extends to cause rack 17a to move to the left, thereby rotating gear segment 16a clockwise about pivot 16. Hook 18 rotates with gear segment 16a, thereby pulling a loop of additional wire from needle 3 as hook 18 moves from position E to position F. Cylinder 20 then retracts, which causes pivot 16 to move toward the stator. This in turn causes hook 18 to move leftward in the general direction from position F to position G, thereby inserting the wire into claw 19. In order to keep the wire taut during this phase of the operation, rack 22 rotates pinion 23 and therefore cam 24. This urges cylinder 17 and therefore rack 17a to the left relative to pivot 16, thereby producing further clockwise pivoting of hook 18 as it moves to its final position G. When hook 18 reaches position G, claw 19 closes on the wire. The foregoing motion of hook 18, together with the wire deflection caused by contact with claw 19, causes the wire to slide into the spacing between hook 25 (pivotally mounted on hook 18) and one side of hook 18, thereby placing the wire in the proximity of the cutter portion 26 (FIG. 8) of hook 25.

Cylinder 21 now retracts to pull additional wire from needle 3. Next the wire is cut by cutting edge 26. This is accomplished by extending cylinder 27, which causes arm 27a to rotate pinion gear 27b, thereby rotating sector gear 28a about pivot 28 and pivoting hook 25 so that cutting edge 26 cuts the wire. The wire held by claw 19 will be subsequently permanently mounted on the end of the stator which is adjacent claw 19 by terminating station apparatus (not shown). Needle 3 is now rotated away from the claw 19 which is holding the winding lead. Needle 3 is then withdrawn from the stator so that the free end of the wire emanating from the needle lies along the upper side of the upper coil as viewed in FIG. 6. After withdrawal from the stator, the end of needle 3 is returned to the vertical position (as shown on the left in FIG. 6) so that hook 5 (operating generally as described above in connection with FIGS. 4 and 5, but without the use of claws 10 and 14 at this time) can catch the wire, pull its free end out of the stator, and then hold the wire (with the aid of clamp 5a) until the next stator is in position and winding of that next stator begins. The wound stator is now moved out of position and a new unwound stator is moved into position for winding.

When the new unwound stator is in position adjacent needles 3, the apparatus of FIGS. 4 and 5 is further operated as generally described above to secure the wire held by hook 5 in claw 14 and to thereafter begin the coil winding process on the new stator.

Figure 2:
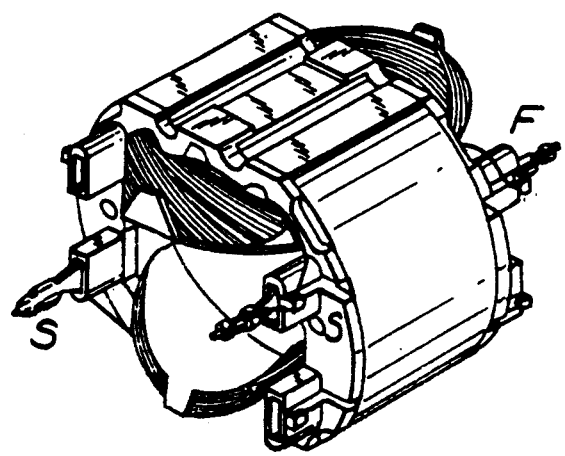
FIG. 2 is a perspective view of a two-pole stator having some coil leads terminated at each end of the stator, and which can be made by the methods and apparatus of this invention.
Figure 3:
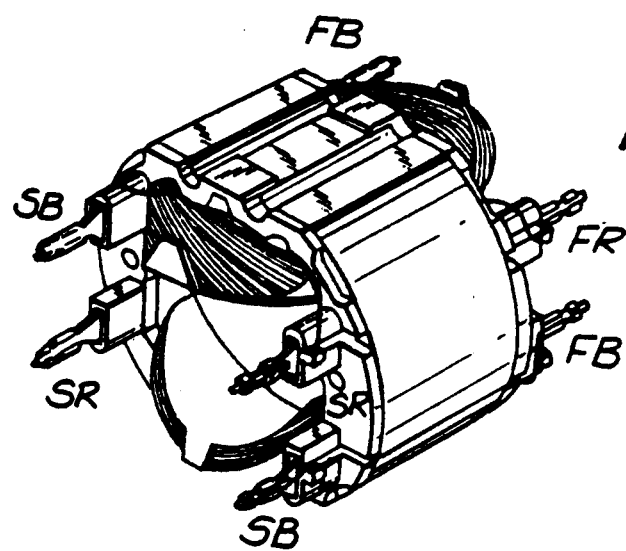
FIG. 3 is a perspective view of another two-pole stator having two coils per pole, the two leads of each coil being terminated at respective opposite ends of the stator. This stator can also be made by the methods and apparatus of this invention.

The result of the coil winding operation described above is a stator of the type shown in FIG. 2, i.e., the start terminaton S of each coil is on the front face of the stator, while the finish termination F of each coil is on the rear face of the stator. If two coils are required on each stator pole (i.e., a regular coil R and a brake coil B as shown in FIG. 3), the winding operation described above can be repeated for each type of coil so that the start SR and finish FR terminations of each regular coil are on respective opposite faces of the stator, and so that the start SB and finish FB termination of each brake coil are also on respective opposite faces of the stator.

I claim:

1. The method of winding a coil of wire on a pole which extends radially inwardly into the interior of a hollow annular stator, said stator having a longitudinal axis which extends through the stator via its hollow interior, said stator further having first and second annular faces adjacent respective opposite ends of said longitudinal axis, said wire being supplied from wire supply means which includes a longitudinal member having a wire outlet at its distal end, said longitudinal member having a first position in which said longitudinal member is outside said stator and said wire outlet is adjacent said first face, and said longitudinal member being extendable substantially parallel to said longitudinal axis from said first position through the hollow interior of said stator to a second position in which said wire outlet is adjacent said second face, said longitudinal member being additionally rotatable substantially about said longitudinal axis while said longitudinal member is in either the first or second position, said method comprising the steps of:

(1) positioning said longitudinal member in said first position relative to said stator;

(2) anchoring the wire extending from said wire outlet in first anchoring means located adjacent said first face of said stator;

(3) alternating extending said longitudinal member from said first position to said second position and retracting said longitudinal member from said second position to said first position, said longitudinal member being also rotated substantially about said longitudinal axis while in said first and second positions to wind said wire extending from said first anchoring means to said wire outlet on said pole to produce said coil of wire on said pole;

(4) stopping said longitudinal member when said coil includes the desired number of windings and said longitudinal member is in said second position;

(5) anchoring the wire extending from said coil to said wire outlet in second anchoring means located adjacent said second face of said stator;

(6) cutting the wire extending from said second anchoring means to said wire outlet, thereby leaving the wire extending from said wire outlet unanchored adjacent said second face of said stator; and (7) retracting said longitudinal member from said second position to said first position with the wire extending from said wire outlet still unanchored adjacent said second face of said stator so that no additional wire is pulled from said wire supply during this step.

2. The method defined in claim 1 wherein said stator is one of a plurality of similar stators which are to be similarly wound one after another, and wherein, after performing steps (1) through (7), said method further comprises the steps of:

(8) replacing said stator with a next stator in said plurality to be wound; and (9) repeating steps (1) through (7) for said next stator.

3. The method defined in claim 2 wherein said replacing step includes the step of:

gripping the wire extending from said wire outlet by gripper means located adjacent said first face of said stator.

4. The method defined in claim 3 wherein each of said stators in said plurality has its own associated said first and second anchoring means, and wherein said step of anchoring said wire in said first anchoring means comprises the step of:

moving at least one of said longitudinal member and said gripper means so that said first anchoring means can anchor the wire between said wire outlet and said gripper means.

* * * * *